(12) United States Patent
Lee et al.

(10) Patent No.: US 7,433,407 B2
(45) Date of Patent: Oct. 7, 2008

(54) METHOD FOR HIERARCHICAL MOTION ESTIMATION

(75) Inventors: Jae-hun Lee, Yongin-si (KR); Nam-suk Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 745 days.

(21) Appl. No.: 10/950,601

(22) Filed: Sep. 28, 2004

(65) Prior Publication Data

US 2005/0074064 A1   Apr. 7, 2005

(30) Foreign Application Priority Data

Oct. 4, 2003   (KR) .................... 10-2003-0069019

(51) Int. Cl.
*H04N 7/12* (2006.01)
*H04N 11/02* (2006.01)
*H04N 11/04* (2006.01)
*H04B 1/66* (2006.01)

(52) U.S. Cl. ................................. 375/240.16

(58) Field of Classification Search ................ None
See application file for complete search history.

(56) References Cited

U.S. PATENT DOCUMENTS

| 6,987,866 | B2 * | 1/2006 | Hu | 382/107 |
| 7,079,579 | B2 * | 7/2006 | Han et al. | 375/240.16 |
| 2003/0012282 | A1 | 1/2003 | Chelladurai et al. | 375/240.16 |
| 2003/0123550 | A1 | 7/2003 | Wang et al. | 375/240.16 |
| 2004/0190616 | A1 * | 9/2004 | Linzer et al. | 375/240.16 |

FOREIGN PATENT DOCUMENTS

| JP | 2002-330443 | 11/2002 |
| JP | 2003-87799 | 3/2003 |
| KR | 2002-85269 | 11/2002 |
| KR | 2003-34271 | 5/2003 |

* cited by examiner

*Primary Examiner*—Nhon T Diep
(74) *Attorney, Agent, or Firm*—Staas & Halsey LLP (57) ABSTRACT

A method for hierarchical motion estimation which can perform motion estimation in various block modes. According to the method, matching criterion values are calculated in units of an upper sub-block using matching criterion values calculated in units of a lowest-order sub-block and a block mode and a motion vector for motion estimation of an input block are determined using a plurality of matching criterion values for each of the various block modes.

12 Claims, 10 Drawing Sheets

8x8 BLOCK MODE

FIG. 2B (PRIOR ART)

8x4 BLOCK MODE

FIG. 2C (PRIOR ART)

4x8 BLOCK MODE

FIG. 2D (PRIOR ART)

4x4 BLOCK MODE

FIG. 3A (PRIOR ART)

16x16 BLOCK MODE

FIG. 3B (PRIOR ART)

16x8 BLOCK MODE

FIG. 3C (PRIOR ART)

8x16 BLOCK MODE

FIG. 3D (PRIOR ART)

8x8 BLOCK MODE

| B4x4 (0) | B4x4 (1) | B4x4 (2) | B4x4 (3) |
|---|---|---|---|
| B4x4 (4) | B4x4 (5) | B4x4 (6) | B4x4 (7) |
| B4x4 (8) | B4x4 (9) | B4x4 (10) | B4x4 (11) |
| B4x4 (12) | B4x4 (13) | B4x4 (14) | B4x4 (15) |

FIG. 7B

| B8x4 (0) | B8x4 (1) |
|---|---|
| B8x4 (2) | B8x4 (3) |
| B8x4 (4) | B8x4 (5) |
| B8x4 (6) | B8x4 (7) |

FIG. 7C

| B4x8 (0) | B4x8 (1) | B4x8 (2) | B4x8 (3) |
|---|---|---|---|
| B4x8 (4) | B4x4 (5) | B4x8 (6) | B4x8 (7) |

FIG. 7D

| B8x8 (0) | B8x8 (1) |
|---|---|
| B8x8 (2) | B8x8 (3) |

METHOD FOR HIERARCHICAL MOTION ESTIMATION

CROSS-REFERENCE TO RELATED APPLICATION

This application claims the priority of Korean Patent Application No. 2003-69019, filed on Oct. 4, 2003, in the Korean Intellectual Property Office, the disclosure of which is incorporated herein by reference.

BACKGROUND OF THE INVENTION

1. Field of the Invention

The present invention relates to hierarchical motion estimation of video data, and more particularly, to a method of hierarchical motion estimation, which allows motion estimation in various block modes.

2. Description of Related Art

Motion estimation, which is one technique for encoding video data, searches a previous frame for a macroblock that is the most similar to a macroblock in a current frame using a specified measurement function and thus obtains a motion vector indicating a difference between locations of the two macroblocks. Motion estimation is the most computationally expensive portion of video data encoding.

In motion estimation of a current block using a full search, if the current block is a 16×16 macroblock, the most similar macroblock to a macroblock in the current frame is searched within a previous frame and a motion vector indicating a difference between locations of the two macroblocks is obtained. A matching criterion value is calculated using a specified measurement function in motion estimation. A macroblock corresponding to the minimum matching criterion value in the previous frame serves as a previous macroblock corresponding to a current macroblock.

When performing motion estimation using the full search, a large amount of computation is required and the amount makes it difficult to implement real-time video data encoding.

To reduce the amount of computation required in motion estimation, various high-speed motion estimation techniques have been developed. A multi-resolution multiple candidate search (MRMCS) is one of them.

Figure 1:
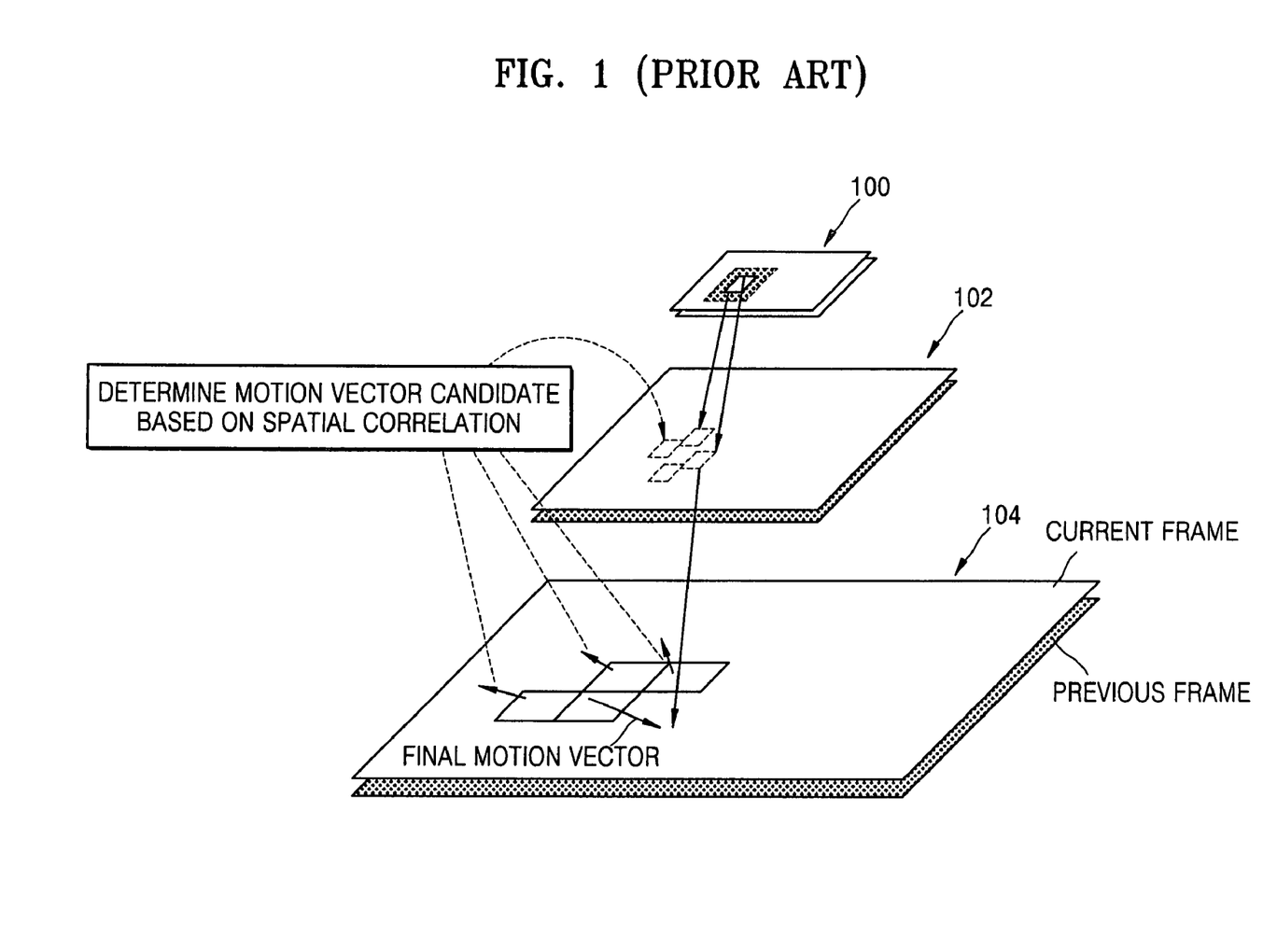
FIG. 1 is a conceptual view of a conventional MRMCS technique.
Figure 2A:
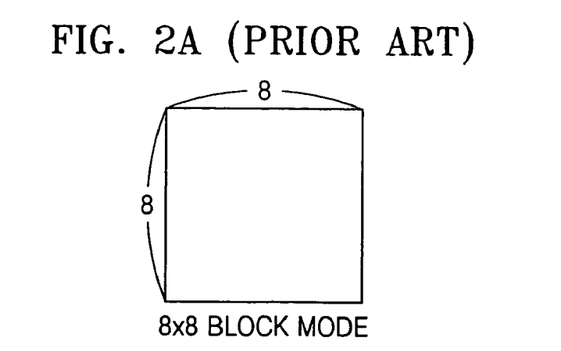
FIGS. 2A-2D and 3A-3D show various block modes for motion estimation used in the H.264 standard.
Figure 2B:
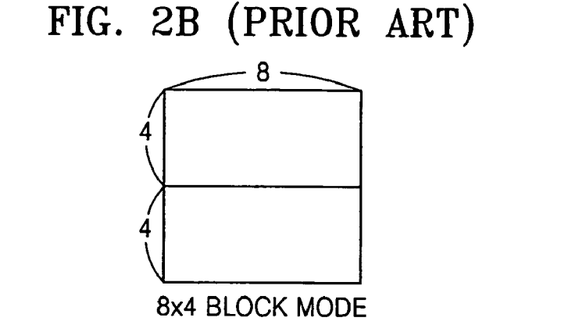
Figure 2C:
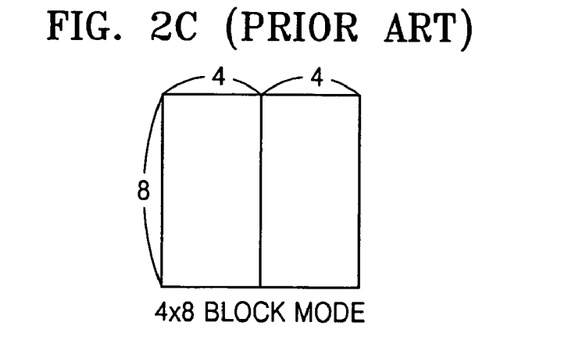
Figure 2D:
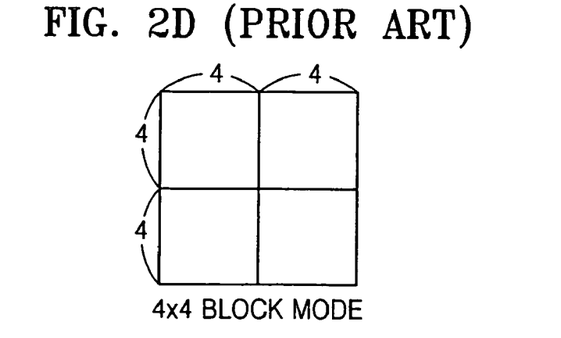
Figure 3A:
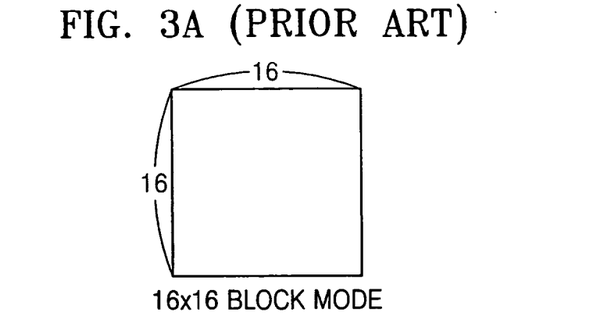
Figure 3B:
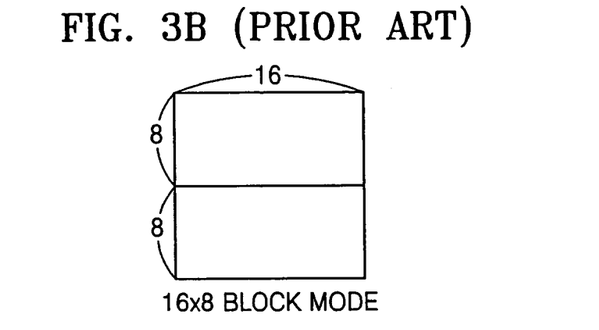
Figure 3C:
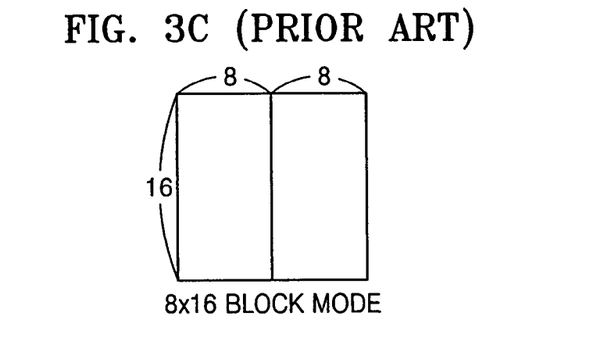
Figure 3D:
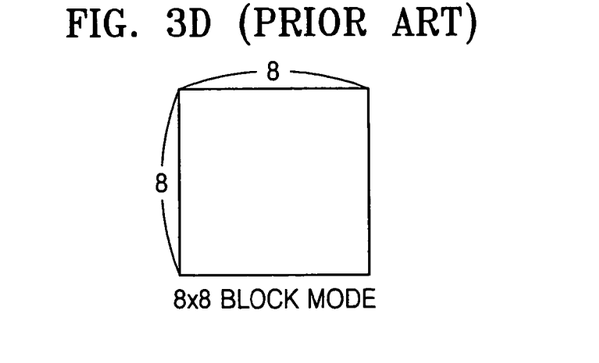

FIG. 1 is a conceptual view of a conventional MRMCS. Referring to FIG. 1, the conventional MRMCS includes a lower level 104, a middle level 102, and an upper level 100. At the lower level 104, a current block to be coded and a previous frame have their original resolutions, respectively. At the middle level 102, the original image of the lower level 104 is decimated horizontally and vertically at a 2-to-1 ratio in order to reduce the resolution. At the upper level 100, the image of the middle level 102 is again decimated horizontally and vertically at a 2-to-1 ratio in order to reduce the resolution. The conventional MRMCS hierarchically performs motion estimation using three images of different resolutions at each level, thereby making high-speed motion estimation possible.

The conventional MRMCS will be described in more detail. It is assumed that motion estimation is performed in units of a 16×16 macroblock and a search range of motion estimation is from −16 pixels to +16 pixels.

In a first operation, a block that is matched to a current 4×4 block that is reduced to ¼ of its original size is searched in a previous frame that is reduced to ¼ of its original size at the upper level 100. A search range is from −4 pixels to +4 pixels, which is ¼ of the original search range. A sum of absolute differences (SAD) is generally used as a criterion for block matching. As a result of block matching at the upper level 100, the best matched block of a current block and the second-best matched block of the current block are determined and a motion vector for each of the determined blocks is obtained.

In a second operation, at the middle level 102, based on three points including upper left apices of the two blocks determined at the upper level 100 and a point that is pointed by a motion vector obtained by taking a median value of motion vectors of three macroblocks that are already coded and located to the left side of, up from, and the upper right side of the current macroblock, a partial search that ranges from −2 pixels to +2 pixels is performed in a previous frame that is reduced to ½ of its original size, thereby obtaining the best matched block of the current block and a motion vector for that case.

In a third operation, based on a upper left apex of a block that is determined to be best matched to the current block at the middle level 102, a partial search that ranges from −2 pixels to +2 pixels is performed on a previous frame of the lower level 104, i.e., a previous frame having its original size, thereby finally obtaining the best matched macroblock of the current macroblock and a motion vector for that case.

Motion estimation adopted in video data encoding standards such as the recently developed H.264 standard (which is part of the Motion Picture Expert Group (MPEG) 4 standard) is performed on not only 16×16 blocks but sub-blocks of 16×8, 8×16, 8×8, 8×4, 4×8, and 4×4 in order to improve the accuracy of motion estimation and the efficiency of encoding.

FIGS. 2A-2D and 3A-3D show various block modes for motion estimation, which are used in H.264 standards. Referring to FIGS. 2A-2D, there is shown a 16×16 block mode, a 16×8 block mode, a 8×16 block mode, and a 8×8 block mode, respectively.

However, since the conventional MRMCS is designed to only perform motion estimation on a macroblock of 16×16 or 8×8, it cannot be used for blocks of various sizes as in H.264 standard.

BRIEF SUMMARY

An embodiment of the present invention provides a method for hierarchical motion estimation, which allows motion estimation in various block modes.

According to one aspect of the present invention, there is provided a method for hierarchical motion estimation. The method comprises determining at least one motion vector candidate for an input block included in a current picture using the current picture and a reference picture at an upper level, determining a motion vector candidate for the input block using a current picture and a reference picture at an middle level based on the at least one motion vector candidate, calculating matching criterion values for a reference block in a reference picture pointed by the motion vector candidate determined at the middle level and the input block, using a specified measurement function in units of a lowest-order sub-block corresponding to a lowest-order block mode among a plurality of block modes for motion estimation, repeating calculation of the matching criterion values with changing the location of the reference block in the reference picture within a specified search range, calculating matching criterion values for the input block and the reference block in units of an upper sub-block of a size that is larger than the lowest-order sub-block, using a plurality of matching criterion values calculated in units of the lowest-order sub-block, and determining a block mode and a motion vector for motion estimation of the input block using the calculated matching criterion values.

According to yet another aspect of the present invention, there is provided a computer readable storage medium encoded with processing instructions for performing the aforementioned method.

According to another aspect of the present invention, there is provided a video data encoder, including: a transformer/quantizer which transforms an input macroblock in a specified manner, quantizes the transformed macroblock, and transforms and quantizes a residual signal; a dequantizer/inverse transformer which receives the transformed macroblock and quantized video data from the transform/quantizer and performs dequantization and an inverse transform on the received video data; a deblocking filter receives the dequantized and inversely transformed video data from the dequantizer/inverse transformer and performs filtering to remove a blocking effect; a picture reproduction unit which receives the filtered video data from the deblocking filter, reproduces the video data on a picture-by-picture basis, and then stores the video data and which stores at least one reference picture; and a motion estimator which receives a current macroblock to be coded, performs hierarchical motion estimation using the at least one reference picture, outputs motion data that contains indices indicating a block mode, a motion vector, or a reference picture, and performs motion estimation. In the motion estimation, matching criterion values are calculated in units of an upper sub-block using matching criterion values calculated in units of a lowest-order sub-block and a block mode and a motion vector for motion estimation of an input block are determined using a plurality of matching criterion values for each of the various block modes.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which.

DETAILED DESCRIPTION OF EMBODIMENT

Reference will now be made in detail to an embodiment of the present invention, an example of which is illustrated in the accompanying drawings, wherein like reference numerals refer to the like elements throughout. The embodiment is described below in order to explain the present invention by referring to the figures.

Figure 4:
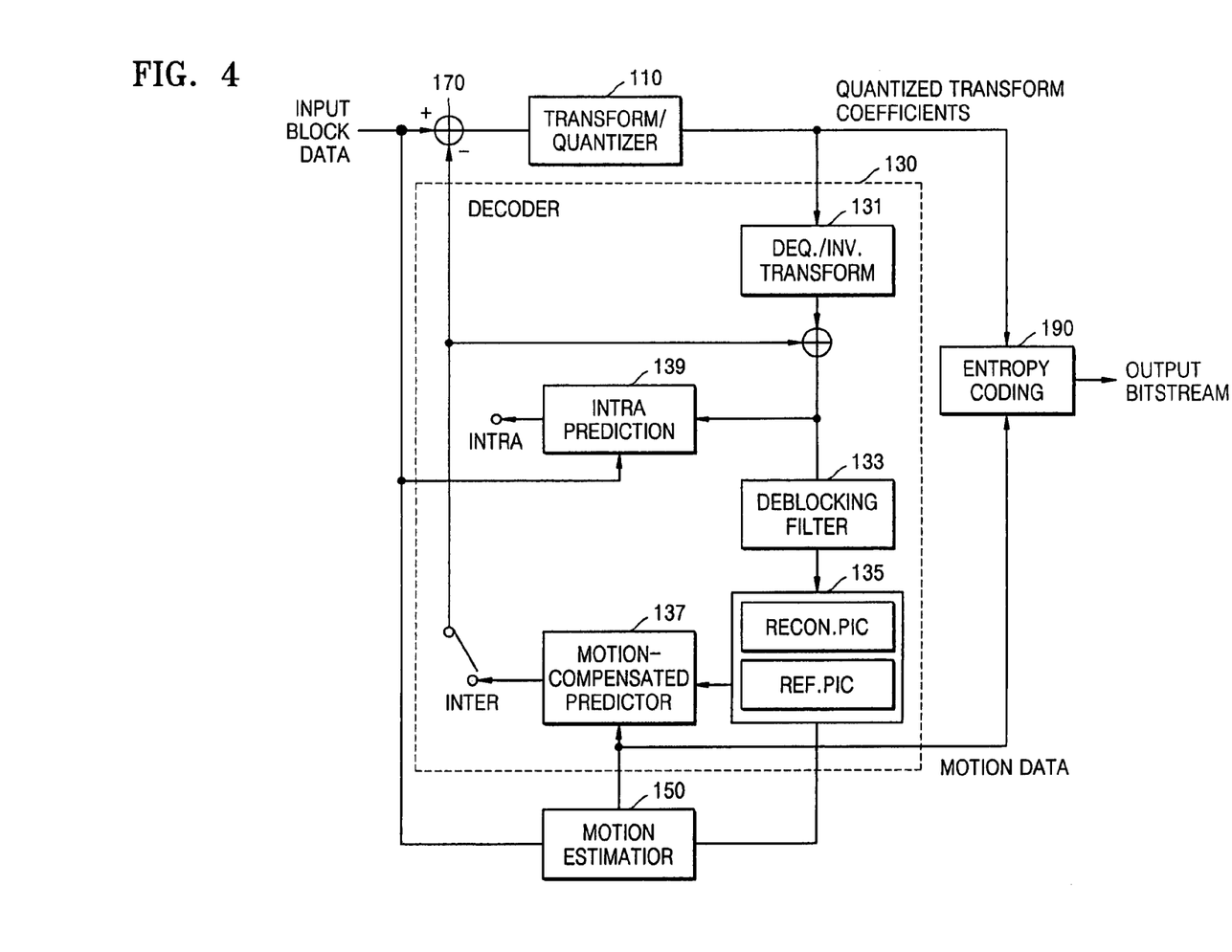
FIG. 4 is a block diagram of a video data encoder according to an embodiment of the present invention.

FIG. 4 is a block diagram of a video data encoder according to an embodiment of the present invention.

Referring to FIG. 4, the video data encoder includes a transform/quantizer 110, a dequantizer/inverse transformer 131, a deblocking filter 133, a picture reproduction unit 135, a motion compensated predictor 137, an intra prediction unit 139, a motion estimator 150, a subtraction unit 170, and an entropy coding unit 190.

Video data is input to the encoder in units of a 16×16 macroblock.

The transform/quantizer 110 transforms an input macroblock in a specified manner and then quantizes the transformed macroblock. Discrete cosine transform (DCT) is representatively used as an image transform algorithm.

The dequantizer/inverse transformer 131 receives the transformed macroblock and quantized video data from the transform/quantizer 110 and performs dequantization and an inverse transform on the received video data.

The deblocking filter 133 receives the dequantized and inversely transformed video data from the dequantizer/inverse transformer 131 and performs filtering to remove a blocking effect.

The picture reproduction unit 135 receives the filtered video data from the deblocking filter 133, reproduces the video data on a picture-by-picture basis, and then stores the video data. A picture may be an image composed of frame units or field units. The picture reproduction unit 135 includes a buffer (not shown) that can store a plurality of pictures. The plurality of pictures stored in the buffer is provided for motion estimation and will be referred to as reference pictures hereafter.

The motion estimator 150 receives a current macroblock to be coded, is provided with at least one reference picture stored in the picture reproduction unit 135, performs hierarchical motion estimation according to the present embodiment, and outputs motion data that contains indices indicating a block mode, a motion vector, or a reference picture. Also, the motion estimator 150 performs motion estimation in various modes variously illustrated in FIGS. 2A-2D and 3A-3D.

The motion compensated predictor 137 extracts a macroblock corresponding to the input macroblock from the reference picture used for motion estimation among the plurality of reference pictures stored in the picture reproduction unit 135, according to the motion data input from the motion estimator 150.

When the input macroblock is inter-picture prediction encoded, the subtraction unit 170 receives the macroblock of the reference picture corresponding to the input macroblock from the motion compensated predictor 137, performs a difference operation between the two macroblocks, and outputs a residual signal.

The residual signal output from the subtraction unit 170 is transformed and quantized by the transform/quantizer 110 and is then entropy coded by the entropy coding unit 190. As a result, an output bitstream is generated.

The intra prediction unit 139 performs intra-picture prediction coding, instead of inter-picture prediction coding, using the reference picture.

Meanwhile, a video data decoder 130 for decoding the bitstream created by the video data encoder includes a dequantizer/Inverse transform 131, a deblocking filter 133, a picture reproduction unit 135, a motion compensated predictor 137, and an intra prediction unit 139.

Figure 5:
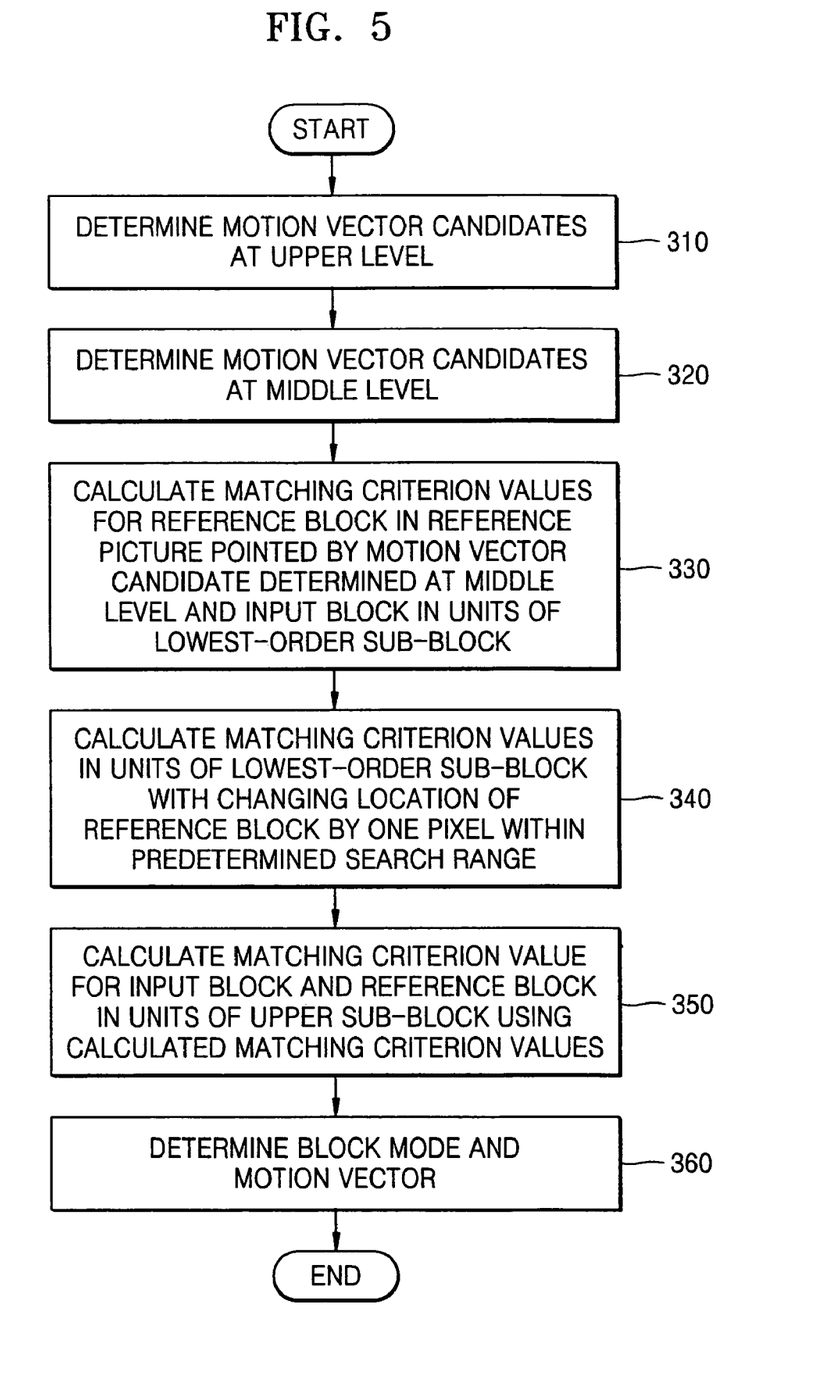
FIG. 5 is a flowchart illustrating a method for hierarchical motion estimation according to the embodiment of the present invention.

FIG. 5 is a flowchart illustrating a method for hierarchical motion estimation according to an embodiment of the present invention.

The method for hierarchical motion estimation determines a motion vector candidate at the upper level 100 and the middle level 102 shown in FIG. 1. Hierarchical motion estimation according to the present invention is performed on a current 16×16 macroblock.

In the first operation 310, two motion vector candidates for a current block are determined at an upper level. In other words, a block that is matched to a 4×4 current block that is reduced to ¼ of its original size is searched using a reference picture that is reduced to ¼ of its original size in order to determine the best matched block and the second-best matched block of the current block, and a motion vector for each of the determined blocks is obtained. When a full search range for motion estimation is from −16 pixels to +16 pixels, a search range at the upper level is ¼ of the original search range, i.e., from −4 pixels to +4 pixels. In this embodiment, an SAD function is used as a criterion for block matching. However, other measurement functions such as a sum of absolute transformed differences (SATD) function or a sum of squared differences (SSD) function may be used.

In operation 320, a motion vector candidate for the current block at the middle level is determined using the two motion vector candidates determined at the upper level. At the middle level, not only the two motion vector candidates determined at the upper level but also motion vectors of previous macroblocks that are already coded, and are adjacent to the current macroblock are used.

Figure 6:
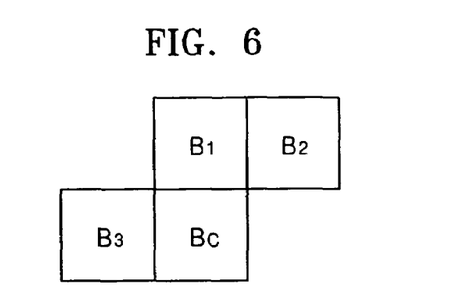
FIG. 6 shows adjacent blocks used for motion estimation of a current block at a middle level.

FIG. 6 shows blocks adjacent to a current block used for motion estimation of the current block at the middle level. Motion vectors of three blocks B3, B1, and B2 that are located to the left side of, up from, and to the upper right side of a current block Bc are used.

In other words, at the middle level, based on three points, i.e., upper left apices of the two matched blocks of the current block, determined at the upper level, in the reference picture and a point pointed by a motion vector obtained by taking a median value of the motion vectors of the three blocks B3, B1, and B2, a partial search that ranges from −2 pixels to +2 pixels is performed. An 8×8 block corresponding to a minimum matching criterion value calculated using an SAD function is searched in a reference picture reduced to ½ of its original size. Once the 8×8 block corresponding to the minimum matching criterion value is determined in the reference picture, a motion vector indicating a change in locations of the current block and the determined block of the reference picture is determined.

Referring to FIG. 5, in operation 330, matching criterion values for the reference block of the reference picture determined at the middle level and the input block are calculated using a specified measurement function in units of a lowest-order sub-block corresponding to a lowest-order block mode of a plurality of block modes for motion estimation.

The method for hierarchical motion estimation supports motion estimation in various block modes such as those shown in FIGS. 2A-2D and 3A-3D. The lowest-order block mode means that a size of a block that serves as a unit block for motion estimation is the smallest, and the unit block for motion estimation in the lowest-order block mode is called the lowest-order sub-block. Among the block modes shown in FIGS. 2A-2D and 3A-3D, the lowest-order block mode is the 4×4 block mode and the lowest-order sub-block is a 4×4 sub-block. The lowest-order sub-block according to the embodiment of the present invention is a 4×4 sub-block.

Figure 7A:
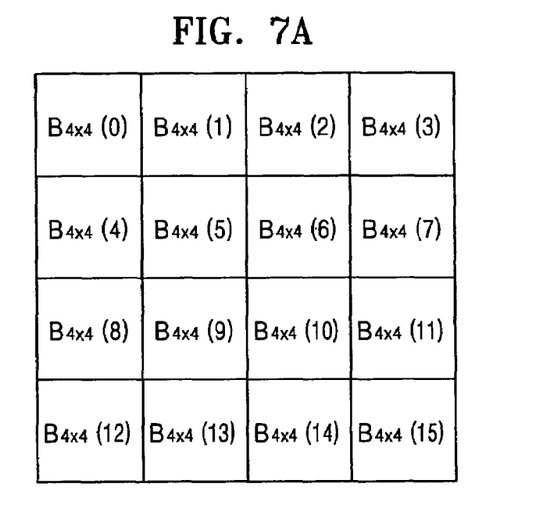
FIGS. 7A through 7G show current macroblocks that are divided into various sub-block units.

FIG. 7A shows current macroblocks that are divided into the lowest-order sub-block units of a 4×4 size. Since the size of the current macroblock is 16×16, the current macroblock is divided into 16 sub-blocks of 4×4, i.e., $B_{4\times4}(0)$ through $B_{4\times4}(15)$ as shown in FIG. 7A.

The block in the reference picture, which is pointed by a motion vector determined to be the motion vector candidate for the current block at the middle level (hereinafter, referred to as a reference block), is also divided into 16 sub-blocks of 4×4. 16 matching criterion values $SAD_{4\times4}(0)$ through $SAD_{4\times4}(15)$ are calculated using the SAD function for each pair of the lowest-order sub-blocks of the current block and the reference block. $SAD_{4\times4}(k)$ indicates a matching criterion value calculated using the SAD function for a $k^{th}$ 4×4 sub-block of the current block and a $k^{th}$ 4×4 sub-block of the reference block.

Returning to FIG. 5, in operation 340, the process of operation 330 is repeated while the location of the reference block in the reference picture at the lower level is changed within a specified search range. When a partial search ranging from −2 pixels to +2 pixels is performed at the lower level, the reference block is moved from its original location 24 times and a matching criterion value for the current block and the reference block is calculated in units of a 4×4 sub-block every time when the reference block is moved. Thus, after performing operations 330 and 340, 25 $SAD_{4\times4}(k)(0<=k<=15)$ are obtained.

In operation 350, matching criterion values for the current block and the reference block are calculated using the matching criterion values for the current block calculated in units of a 4×4 sub-block in operations 330 and 340, in units of an upper sub-block having a size that is larger than the lowest-order sub-block of 4×4.

Figure 7B:
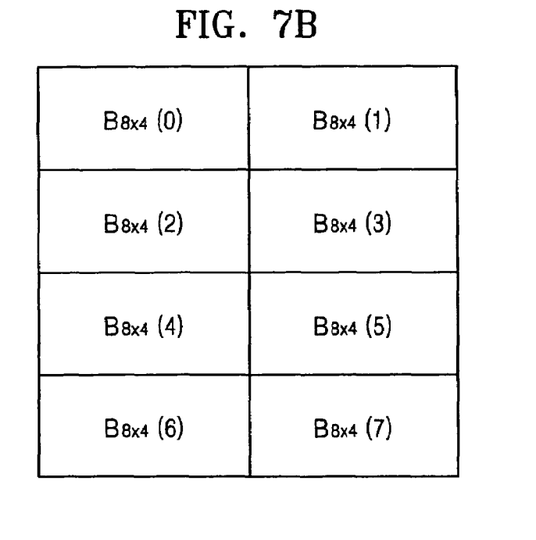
Figure 7C:
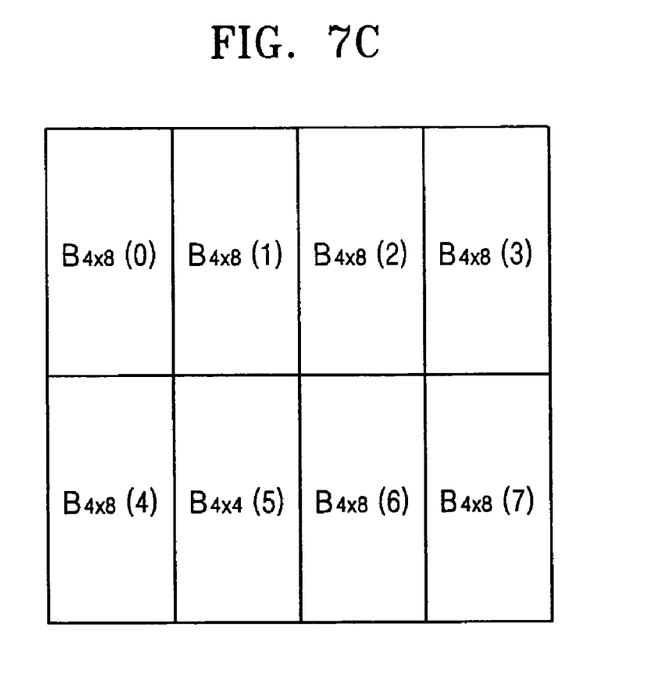
Figure 7D:
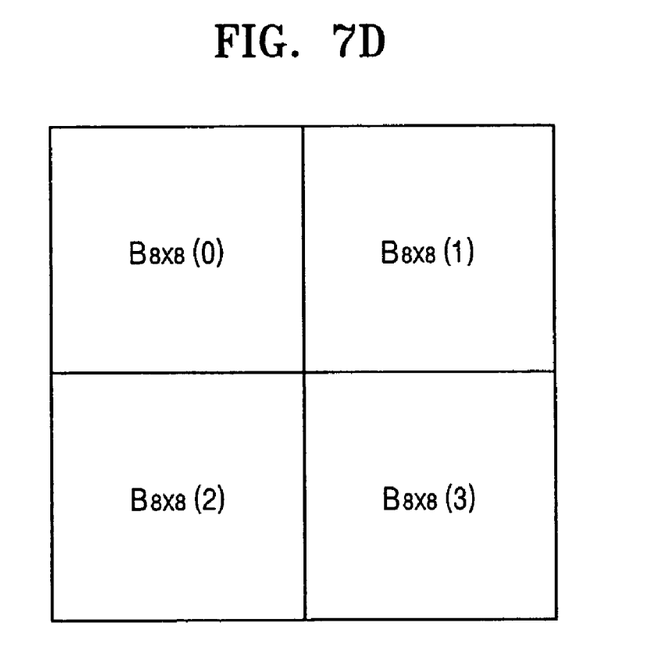
Figure 7E:
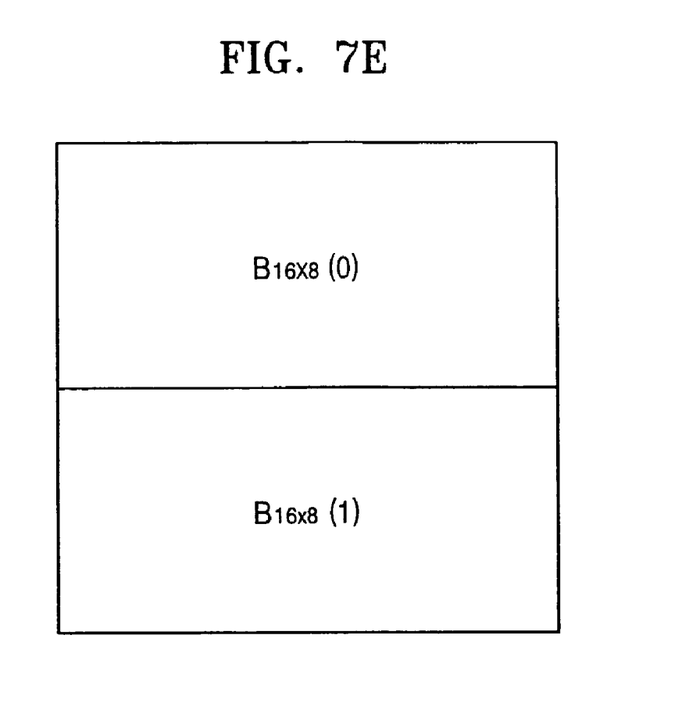
Figure 7F:
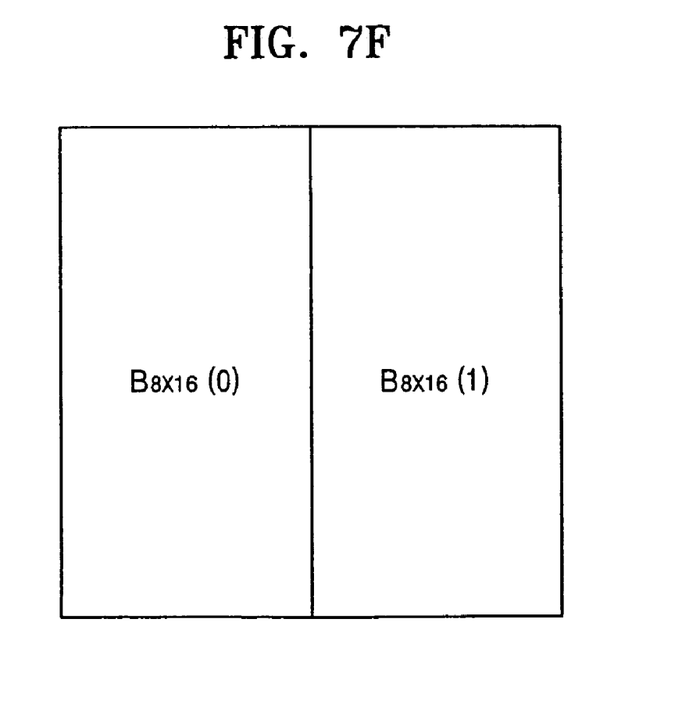
Figure 7G:
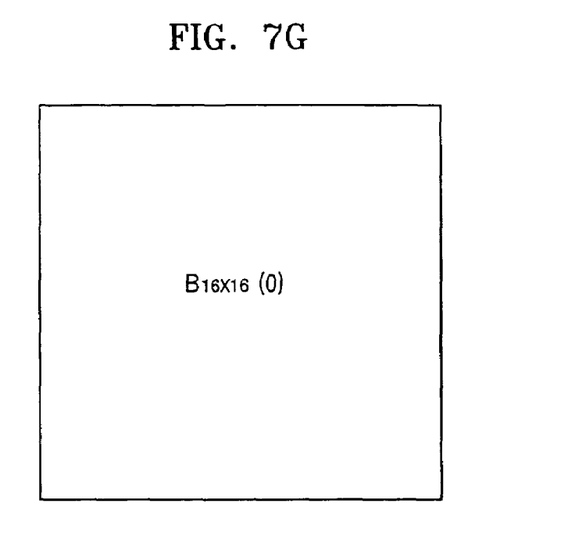

FIGS. 7B through 7G show macroblocks, each of which is divided into blocks of a size that is larger than 4×4. FIG. 7B shows a macroblock that is divided into 8 sub-blocks of 8×4, FIG. 7C shows a macroblock that is divided into 8 sub-blocks of 4×8, FIG. 7D shows a macroblock that is divided into 4 sub-blocks of 8×8, FIG. 7E shows a macroblock that is divided into 2 macroblocks of 16×8, FIG. 7F shows a macroblock that is divided into 2 macroblocks of 8×16, and FIG. 7G shows a current macroblock that is not divided.

Assuming that matching criterion values for the current block and the reference block that are calculated using the SAD function in units of a 8×4 sub-block as shown in FIG. 7B are $SAD_{8\times4}(0)$ through $SAD_{8\times4}(7)$, for example, $SAD_{8\times4}(0)$ is obtained by summing $SAD_{4\times4}(0)$ and $SAD_{4\times4}(1)$, and $SAD_{8\times4}(2)$ is obtained by summing $SAD_{4\times4}(4)$ and $SAD_{4\times4}(5)$.

Assuming that matching criterion values for the current block and the reference block that are calculated using the SAD function in units of a 4×8 sub-block as shown in FIG. 7C are $SAD_{4\times8}(0)$ through $SAD_{4\times8}(7)$, for example, $SAD_{4\times8}(0)$ is obtained by summing $SAD_{4\times4}(0)$ and $SAD_{4\times4}(4)$, and $SAD_{4\times8}(1)$ is obtained by summing $SAD_{4\times4}(1)$ and $SAD_{4\times4}(5)$.

Similarly, $SAD_{8\times8}$, $SAD_{16\times8}$, $SAD_{8\times16}$ and $SAD_{16\times16}$ also can be calculated by summing some of previously calculated matching criterion values $SAD_{4\times4}$.

In the conventional art, the best matched block of the current block and a motion vector are determined by performing a partial search ranging from −2 pixels to +2 pixels at the lower level in units of a 16×16 or 8×8 current block based on an upper left apex of a block determined at the middle level. However, in the present embodiment of the present invention, since matching criterion values are calculated in units of an upper sub-block using matching criterion values calculated through a partial search performed in units of the lowest-order sub-block, it is not necessary to calculate matching reference values separately for each of various block modes as in prior art. Therefore, the amount of computation can be reduced, and memory capacity required for motion estimation can be reduced by performing a partial search instead of a full search.

In operation 360, the accuracy of motion estimation and the amount of bit generated during coding in various block modes such as those shown in FIGS. 2A-2D and 3A-3D are determined by using matching criterion values for various subblocks calculated in operations 330 through 350, and a block mode and a motion vector for motion estimation of the current macroblock are finally determined.

Once matching criterion values are calculated for the current block and the reference block for each block mode, the location of the reference block and a motion vector corresponding to the minimum matching criterion value can be determined for each block mode. Once a motion vector is determined for each block mode, the amount of bit generated during coding is estimated for each block mode and a block mode and a motion vector for motion estimation of the current macroblock are finally determined based on the amount of bit generated for each block mode.

Once matching criterion values are calculated for each of various block modes for motion estimation, a block mode and a motion vector for motion estimation of the current macroblock can be determined in accordance with conventional techniques such as H.264. Therefore, a procedure of determining the block mode and the motion vector for motion estimation will not be described in detail.

Figure 8A:
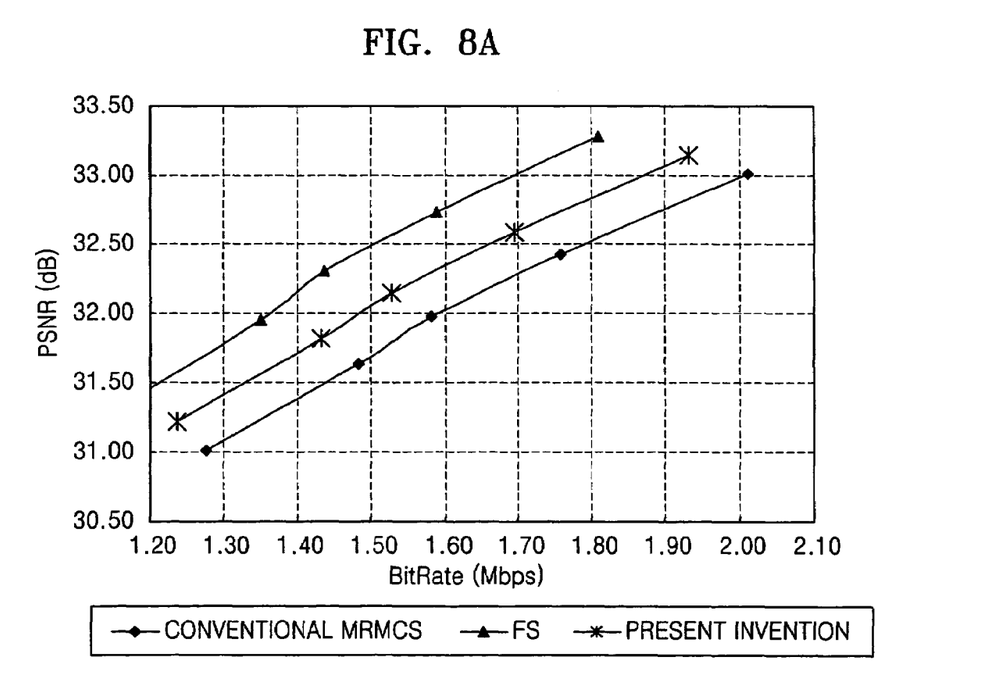
FIGS. 8A and 8B are graphs showing the performance of conventional motion estimation and the performance of the method for motion estimation according to the method of FIG. 5.
Figure 8B:
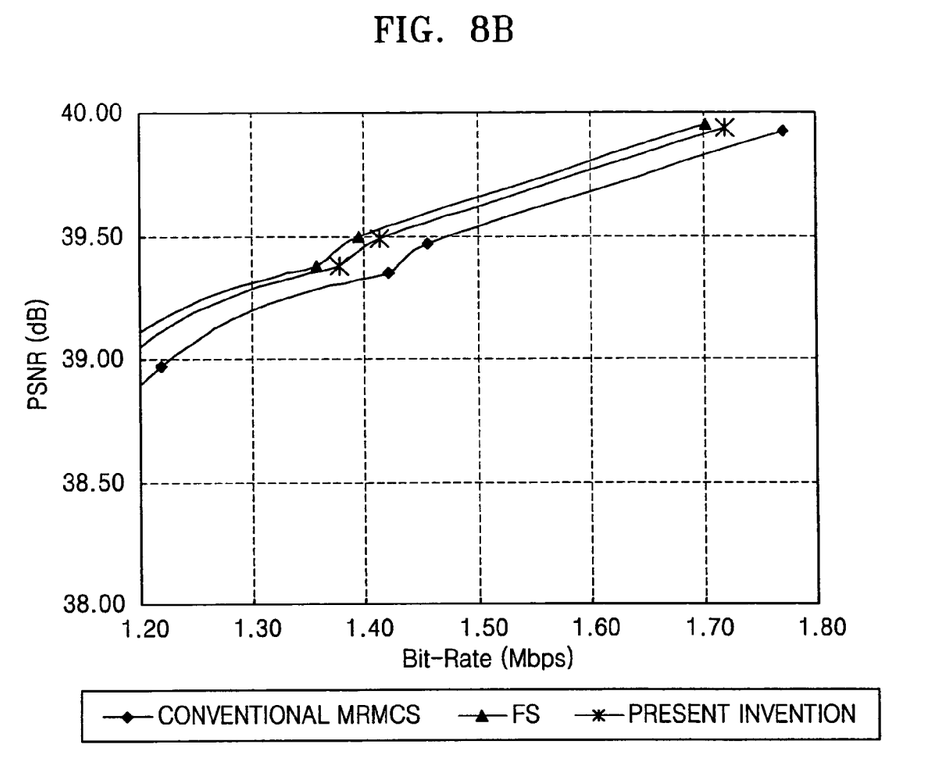

FIGS. 8A and 8B are graphs showing the performance of conventional motion estimation and the performance of the method for motion estimation according to the present embodiment. FIG. 8A is a graph showing peak signal to noise ratios (PSNR) when a test image sequence called "Football" that is used in the H.264 standard is coded using conventional MRMCS, a full search, and the method for motion estimation according to the present invention. The PSNR of an image encoded using the method for motion estimation according to the present invention at the same bit rate is smaller than that of an image encoded using the full search, but is larger than that of an image encoded using the conventional MRMCS at all times.

FIG. 8B is a graph showing PSNR when a test image sequence called "Susie" that is used in H.264 standards is coded using conventional techniques and the method for motion estimation according to the present invention. Since "Susie" is the test image sequence showing a motion that is smaller than "Football", there is no significant difference in performance among three methods, i.e., conventional MRMCS, the full search, and the method for motion estimation according to the present invention. However, as in FIG. 8A, the PSNR of the image coded using the method for hierarchical motion estimation according to the present invention at the same bit rate is larger than the image coded using conventional MRMCS at all times.

The disclosed embodiment of the present invention provides the method for hierarchical motion estimation, which allows motion estimation in various block modes and more accurate motion estimation. Also, since matching criterion values are calculated in units of an upper sub-block using matching criterion values calculated through a partial search performed in units of the lowest-order sub-block, it is not necessary to calculate matching reference values separately for each of various block modes as in the conventional art. Therefore, the method for hierarchical motion estimation according to the disclosed embodiment of the present invention makes it possible to perform high-speed motion estimation and real-time video data encoding. When the method for hierarchical motion estimation according to the disclosed embodiment of the present invention is implemented as hardware, a partial search instead of a full search is performed at the lower level. Therefore, it is possible to reduce a memory size required for motion estimation.

Meanwhile, the disclosed embodiment of the present invention can also be embodied as a computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves. The computer readable recording medium can also be distributed over network coupled computer systems so that the computer readable code is stored and executed in a distributed fashion.

Although an embodiment of the present invention have been shown and described, the present invention is not limited to the described embodiment. Instead, it would be appreciated by those skilled in the art that changes may be made to the embodiment without departing from the principles and spirit of the invention, the scope of which is defined by the claims and their equivalents.

What is claimed is:

1. A method of hierarchical motion estimation, comprising:
   determining at least one motion vector candidate for an input block included in a current picture using the current picture and a reference picture at an upper level;
   determining a motion vector candidate for the input block using a current picture and a reference picture at an middle level based on the at least one motion vector candidate;
   calculating matching criterion values for a reference block in a reference picture pointed to by the motion vector candidate determined at the middle level and the input block, using a specified measurement function in units of a lowest-order sub-block corresponding to a lowest-order block mode among a plurality of block modes for motion estimation;
   repeating calculation of the matching criterion values with changing the location of the reference block in the reference picture within a specified search range;
   calculating matching criterion values for the input block and the reference block in units of an upper sub-block of a size that is larger than the lowest-order sub-block, using a plurality of matching criterion values calculated in units of the lowest-order sub-block; and
   determining a block mode and a motion vector for motion estimation of the input block using the calculated matching criterion values.

2. The method of claim 1, wherein in the calculation of the matching criterion values in units of the upper sub-block, at least two matching criterion values calculated in units of the lowest-order sub-block included in the upper sub-block are summed.

3. The method of claim 1, wherein the lowest-order sub-block is a 4×4 block.

4. The method of claim 1, wherein the upper sub-block is at least one of the group consisting of 8×4, 4×8, 8×8, 16×8, 8×16 and 16×16 blocks.

5. The method of claim 1, wherein the specified measurement function used for the calculation of the matching criterion values is one of the group consisting of a sum of absolute differences function, a sum of absolute transformed differences, and a sum of squared differences.

6. The method of claim 1, wherein, in the repetition of the calculation of the matching criterion values with the change in the location of the reference block in the reference picture, the calculation of the matching criterion values is repeated with changing the location of the reference block vertically or horizontally in a range of −2 pixels to +2 pixels.

7. A video data encoder, comprising:
- a transformer/quantizer which transforms an input macroblock in a specified manner, quantizes the transformed macroblock, and transforms and quantizes a residual signal;
- a dequantizer/inverse transformer which receives the transformed macroblock and quantized video data from the transform/quantizer and performs dequantization and an inverse transform on the received video data;
- a deblocking filter receives the dequantized and inversely transformed video data from the dequantizer/inverse transformer and performs filtering to remove a blocking effect;
- a picture reproduction unit which receives the filtered video data from the deblocking filter, reproduces the video data on a picture-by-picture basis, and then stores the video data and which stores at least one reference picture; and
- a motion estimator which receives a current macroblock to be coded, performs hierarchical motion estimation using the at least one reference picture, outputs motion data that contains indices indicating a block mode, a motion vector, or a reference picture, and performs motion estimation,
- wherein, in the motion estimation, matching criterion values are calculated in units of an upper sub-block using matching criterion values calculated in units of a lowest-order sub-block and a block mode and a motion vector for motion estimation of an input block are determined using a plurality of matching criterion values for each of the various block modes.

8. The video data encoder of claim 7, wherein video data is input to the encoder in units of a 16×16 macroblock.

9. The video data encoder of claim 7, wherein the transformer/quantizer uses an image transform algorithm to transform the input macroblock.

10. The video data encoder of claim 9, wherein the image transform algorithm is a discrete cosine transform (DCT) algorithm.

11. The video data encoder of claim 7, wherein the picture reproduction unit includes a buffer which can store a plurality of reference pictures.

12. The video data encoder of claim 7, further comprising:
- a motion compensated predictor which extracts a macroblock corresponding to the input macroblock from the at least one reference picture, according to motion data input from the motion estimator;
- a subtraction unit which, when the input macroblock is inter-picture prediction encoded, receives the macroblock of the reference picture corresponding to the input macroblock from the motion compensated predictor, performs a difference operation between the two macroblocks, and outputs the residual signal;
- an entropy coding unit which entropy codes the transformed and quantized residual signal to output an output bitstream; and
- an intra prediction unit which performs intra-picture prediction coding using the at least one reference picture.

* * * * *